Patented Apr. 29, 1924.

1,492,194

UNITED STATES PATENT OFFICE.

CARL BEINDL, OF FRANKFORT-ON-THE-MAIN, GERMANY.

METHOD OF PRODUCING HYDROCYANIC ACID.

No Drawing. Application filed April 6, 1923. Serial No. 630,405.

*To all whom it may concern:*

Be it known that I, CARL BEINDL, a citizen of the Republic of Germany, residing at Frankfort-on-the-Main, Germany, have invented a certain new and useful Method of Producing Hydrocyanic Acid, of which the following is a specification.

This invention relates to the production of hydrocyanic acid and has for its object to increase the obtainable yield of such acid.

According to this invention, hydrocyanic acid is produced by passing mixtures of gaseous or volatile compounds of nitrogen such as ammonia, with volatile carbon compounds such as carbon monoxide, over heated contact substances, together with small quantities of other gases which favor the reaction. It was previously thought important to use pure reaction gases but recent researches have shown that the addition of other gases than those constituting the final product are of advantage, the kind and amount of additional gas depending on the nature of the catalysts. The addition of from 2 to 5% of oxygen or of air has been found advantageous.

It has also been found that limited quantities of free nitrogen increase the yield of hydrocyanic acid either by entering into the reaction or by retarding the decomposition of the product. The nitrogen added for this purpose can be mixed with the reaction gases as such or together with oxygen, as for example, when air is added to the reaction gases.

The following substances can be used as contact substances, e. g. uranium, tungsten, titanium, rhodium, osmium, molybdenum, magnesium, aluminum, the elements of the iron group, the group of the rare earth metals, further alloys and compounds of the said metals or substances, which either contain the said metals or compounds thereof.

It has been further found that particularly good yields can be obtained by using mixtures of more than one contact substance, in such proportions that one constituent predominates. Contact bodies may be prepared from such compounds as the carbonates, nitrates or oxides of the respective metals. The preferred method of preparing them is by subjecting these compounds to the action of the reaction gases at an elevated temperature in the contact chamber. The contact bodies so formed may consist of mixtures of metal, metal nitride, and metal oxide and show excellent catalytic effects over long periods. The catalysts can be further activated by the addition of alkali metals, alkali earth metals, or earth metals.

What I claim is:

1. The method of producing hydrocyanic acid which comprises passing volatile nitrogen compounds with volatile carbon compounds over heated contact material together with small quantities of oxygen.

2. The method of producing hydrocyanic acid which comprises passing volatile nitrogen compounds with volatile carbon compounds over heated contact material together with small quantities of oxygen and nitrogen.

3. The method of producing hydrocyanic acid which comprises passing volatile nitrogen compounds with volatile carbon compounds over heated contact material together with about from 2 to 5% of air.

In testimony whereof I have signed my name to this specification in the presence of two subscribing witnesses.

CARL BEINDL.

Witnesses:
BASIL E. SAVARD,
C. C. L. B. WYLES.